United States Patent
Casaburo

(10) Patent No.: US 11,763,558 B1
(45) Date of Patent: Sep. 19, 2023

(54) VISUALIZATION OF EXISTING PHOTO OR VIDEO CONTENT

(71) Applicant: Apple Inc., Cupertino, CA (US)

(72) Inventor: Daniele Casaburo, San Jose, CA (US)

(73) Assignee: APPLE INC., Cupertino, CA (US)

( * ) Notice: Subject to any disclaimer, the term of this patent is extended or adjusted under 35 U.S.C. 154(b) by 39 days.

(21) Appl. No.: 16/844,523

(22) Filed: Apr. 9, 2020

Related U.S. Application Data

(60) Provisional application No. 62/836,163, filed on Apr. 19, 2019.

(51) Int. Cl.
*G06T 7/80* (2017.01)
*G06T 19/00* (2011.01)
*G06T 7/73* (2017.01)
*G06V 20/20* (2022.01)

(52) U.S. Cl.
CPC ............... *G06V 20/20* (2022.01); *G06T 7/75* (2017.01); *G06T 7/80* (2017.01); *G06T 19/006* (2013.01)

(58) Field of Classification Search
CPC ............ G06V 20/20; G06T 7/80; G06T 7/75; G06T 19/006
See application file for complete search history.

(56) References Cited

U.S. PATENT DOCUMENTS

| 8,144,232 B2 | 3/2012 | Larson et al. |
| 9,342,927 B2 | 5/2016 | Adhikari et al. |
| 2009/0054084 A1 | 2/2009 | Buhrke et al. |
| 2011/0228112 A1* | 9/2011 | Kaheel et al. ......... H04N 5/772 348/208.4 |
| 2012/0023103 A1* | 1/2012 | Soderberg et al. ..... G06F 16/51 707/E17.031 |
| 2012/0249787 A1* | 10/2012 | Allegra et al. ....... G06V 40/172 348/143 |
| 2015/0049948 A1* | 2/2015 | Bala .................... G06V 10/235 382/182 |

(Continued)

OTHER PUBLICATIONS

"Meta Quest 2: immerGallery - VR photo gallery app review," Mixed, 11 pages, Sep. 24, 2022 [retrieved from the Internet on Dec. 19, 2022] https://mixed-news.com/en/meta-quest-2-immergallery-vr-photo-gallery-app-review/ .

(Continued)

*Primary Examiner* — Sam Bhattacharya
(74) *Attorney, Agent, or Firm* — Thompson Hine LLP

(57) ABSTRACT

Systems, devices, and methods disclosed herein represent existing photo or video content within computer generated reality (CGR) environments. In some implementations, a representation of an existing photo or video is positioned within a CGR environment based on the position of the camera of the existing photo/video at the time the existing photo or video was captured. For example, a user experiencing CGR while walking along a hiking trail may see a floating representation of a photo that the user took on his or her last trip on that hiking trail. The representation may be positioned and oriented in the same position and orientation that the camera was positioned and oriented in when the photo was first captured, e.g., 5 feet above the ground, three feet north of the hiking trail welcome sign. The representation may be a version of the image itself or provide information about the image.

21 Claims, 5 Drawing Sheets

(56) References Cited

U.S. PATENT DOCUMENTS

| | | | | |
|---|---|---|---|---|
| 2015/0271393 | A1* | 9/2015 | Cudak et al. | H04N 5/91 |
| | | | | 348/159 |
| 2015/0281593 | A1* | 10/2015 | Slaby et al. | G06F 16/583 |
| | | | | 348/164 |
| 2017/0359442 | A1 | 12/2017 | Jordan | |
| 2019/0172226 | A1* | 6/2019 | Fergie et al. | G06T 5/20 |
| 2019/0318541 | A1* | 10/2019 | Sergott et al. | H04W 4/029 |
| 2019/0333260 | A1* | 10/2019 | Pedrosa et al. | B64D 47/08 |
| 2020/0090405 | A1* | 3/2020 | Lagmanson | G06T 19/006 |

OTHER PUBLICATIONS

"Snap and Disney team up to create an AR Cinderella Castle mural at Disney World," TechCrunch.com, 2 pages, Apr. 22, 2022 [retrieved from the internet on Dec. 19, 2022] https://techcrunch.com/2022/04/22/snap-and-disney-team-up-to-create-an-ar-cinderella-castle-mural-at-disney-world/ .

* cited by examiner

VISUALIZATION OF EXISTING PHOTO OR VIDEO CONTENT

CROSS-REFERENCE TO RELATED APPLICATIONS

This Application claims the benefit of U.S. Provisional Application Serial No. 62/836,163 filed Apr. 19, 2019, which is incorporated herein in its entirety.

TECHNICAL FIELD

The present disclosure generally relates to computer generated reality (CGR) environments, and in particular, to systems, methods, and devices for including or representing existing images (photo or video) during the presentation of CGR environments.

BACKGROUND

People take photos and videos to record important occasions, travel, sports, meals, parties, everyday activities, and numerous other items and events. However, people may have difficulty remembering that particular photos and videos exist or have difficulty finding photos and videos that have similarities to their current circumstances. For example, while revisiting the Grand Canyon, a person might enjoy seeing photos that he or she took on a prior visit to the Grand Canyon 10 years before. However, the person may not remember that the photos exists or may have difficulty finding the photos amongst the thousands of other photos archived on his or her devices and accounts. Moreover, a person may wish to recreate a new version of a particular existing photo, but may have trouble doing so. For example, the person may wish to take a selfie in the same spot as a 10 year old selfie and then post the similar images together on social media. However, he or she may have difficulty identifying the right location from which to take the new selfie to match the existing selfie or the right camera characteristics to use to achieve similarity.

SUMMARY

In some implementations, existing photo or video content is represented within computer generated reality (CGR) environments. In some implementations, a representation of an existing photo or video is positioned within a CGR environment based on the position of the camera of the existing photo/video at the time the existing photo or video was captured. For example, a user experiencing CGR while walking along a hiking trail will see a floating representation of a photo that the user took on his or her last trip on that hiking trail. The representation may be positioned and oriented in the same position that the camera was positioned and oriented when the photo was first captured, e.g., 5 feet above the ground three feet north of the hiking trail's welcome sign. The representation of the image may be a version of the image itself. The representation may be based on or provide information about the image. For example, it may be based on or provide attributes such as the zoom, focus, resolution, camera extrinsics, camera height, time of day, date, weather, filters, detected image content objects, detected capture location coordinates or name, metadata, keywords, labels, etc.

Some implementations disclosed herein provide a method performed at an electronic device having a processor. The method involves identifying a location of a computing device in a physical environment. For example, such a location may be determined using global positioning system (GPS) components of the CGR device or a nearby device, WI-FI beacons, motion tracking or other techniques. The location may specify a particular position, area, zone, boundary, or otherwise identify a location that can be matched with a location of an existing image. For example, the location may be identified based on the latitude, longitude, or elevation of the CGR device, e.g., on the north side of the Eiffel Tower. The location may be determined based on other information, such as the CGR device's orientation (e.g., where the device is facing), the content of current images being captured by the device (e.g., by detected that the content depicts unique monuments, statues, and other fixed objects), and information from other devices at the location (e.g., messages from other devices providing location information).

After identifying the location of a computing device, the method identifies an existing image that is also associated with that location. For example, the image may be identified by determining that the location of the physical environment is within a predetermined distance of a position association with a prior image. The position associated with the prior image may be the position of an image capture device at a time when the image was captured by the image capture device. For example, based on determining that the user is currently experiencing a CGR environment on the sidewalk on the north side of the Eiffel Tower, a 10 year old photo taken from a similar location (e.g., within 25 feet) from the user's last trip to see the Eiffel tower may be identified.

The method further involves presenting a representation of the image in a CGR environment based on the position of the image capture device at the time when the image was captured. As a specific example, a representation (e.g., a small floating rectangle with the image of the Eiffel Tower from 10 years ago) may be added as a virtual object at the same 3D location (and orientation) as the camera that took that prior image, e.g., 5 feet from the curb, directly between the light posts, and 50 inches above the sidewalk. The representation may have a pose (e.g., position and orientation) in 3D space that is based on the pose of the camera when the image was captured. The representation may be the image itself, an icon, text, the image plus additional content, etc. The representation may have characteristics based on the intrinsics, extrinsics, optics, semantic information, or context associated with the capturing of the image. Such characteristics may provide more information or an otherwise better experience to the user, for example, providing the user within information about which camera settings to use and which time of day to recreate a new version of a prior image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
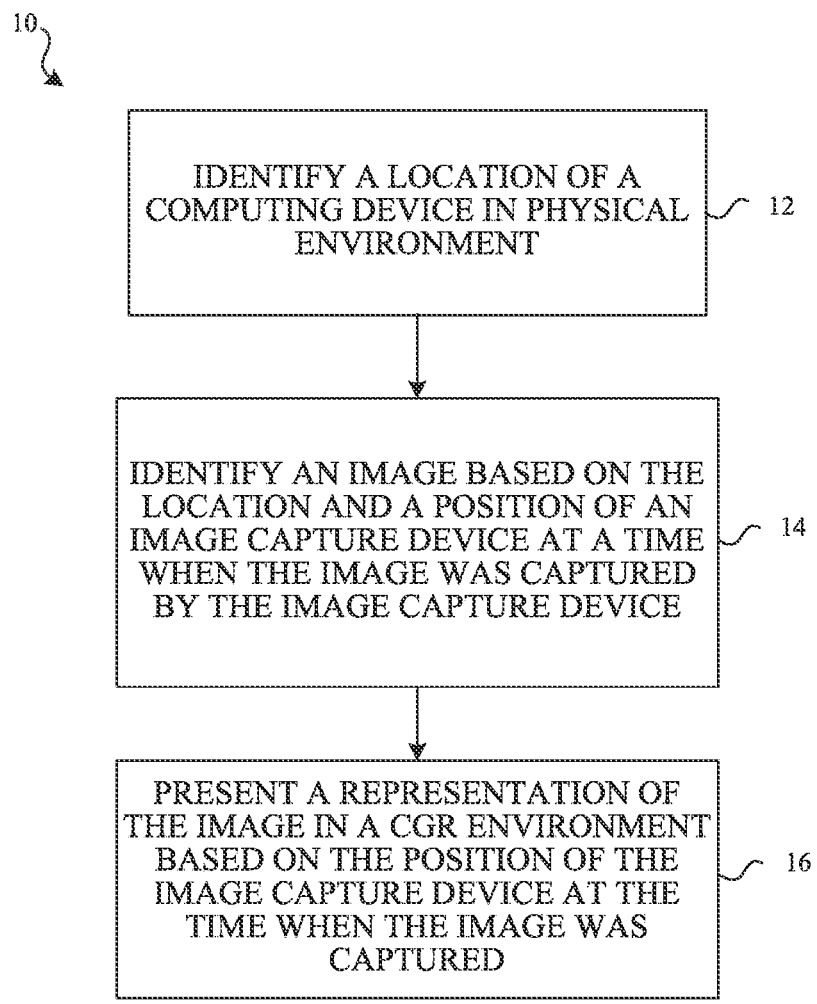
FIG. 1 is a flowchart representation of a method of providing visualization of existing photo or video content in a computer generated reality (CGR) environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a flowchart representation of a method 10 of providing visualization of existing photo or video content during computer generated reality (CGR) environments. In some implementations, the method 10 is performed by a device (e.g., device 700 of FIG. 7). The method 10 can be performed at a mobile device, head mounted device (HMD), desktop, laptop, or server device. In some implementations, the method 10 is performed by processing logic, including hardware, firmware, software, or a combination thereof. In some implementations, the method 10 is performed by a processor executing code stored in a non-transitory computer-readable medium (e.g., a memory).

At block 12, the method 10 identifies a location of a computing device in a physical environment. For example, such a location may be determined using GPS, WI-FI beacons, motion tracking or other techniques to determine that the CGR device is currently at particular set of real world coordinates. The location may be identified based on the latitude, longitude, or elevation of the CGR device. The location may account for a pose of the CGR device. For example, if the CGR device is oriented so that a camera of the device is pointing north and capturing images from that direction for use in the CGR environment, the location may be a location or area north of the location of the CGR device, e.g., the location of objects that will be captured in images captured by the CGR device and potentially included in CGR content. The location may be determined based on the content of images of the physical environment. For example, particular landmarks, geographic features, unique buildings, statues, and the like may be detected (e.g., via computer vision, computer learning-based object recognition, etc.). The location of such objects can be determined using a lookup technique, e.g., to identify coordinates of the Statue of Liberty, etc.

The location may be based on sensor data. Sensors include, but are not limited to: axial accelerometers for measuring changes in velocity along one to three axes, axial axis gyroscopes for measuring angular velocity about one to three axes, axial magnetometers for measuring information regarding magnetic fields relative to one to three axes, a barometric pressure sensor for measuring atmospheric pressure, a clock, an ambient light sensor for measuring ambient light, and the like. In some implementations, sensor data is received from a separate local or remote device. For example, the method 10 may be performed by a mobile phone or head-mounted device (HMD) that receives sensor data from a watch the user is wearing or from a remote global positioning system (GPS) server.

At block 14, the method 10 identifies an image based on the location and a position of an image capture device at a time when the image was captured by the image capture device. For example, the image may be identified by determining that the location of the physical environment is within a predetermined distance of a position association with a prior image. The position associated with the prior image may be the position of an image capture device at a time when the image was captured by the image capture device. Such a position may have been identified at the time the image was captured, for example, based on location tracking of the image capture device that captured the image. The position may have been identified after the image was captured, for example, based on analysis of the image content, manual labeling or tagging, etc.

The image is identified in method 10 based on the position of the image being similar to the location. In some implementations, the location is represented in geographic coordinates and the image is identified based on its position being within a predetermined threshold distance of that location. For example, based on determining that the user is currently experiencing a CGR environment on the sidewalk on the north side of the Eiffel Tower, a 10 year old photo taken from a similar location (e.g., within 25 feet) from the user's last trip to see the Eiffel tower may be identified. In some implementations, the location is an area representing nearby (or all) area within the field of view of the CGR device, e.g., the area in front of the CGR device's field of view within a predetermined distance ahead. For example, the area may be a rectangular or triangular area from the CGR device's current location and extending ahead in a direction based on the orientation of the CGR device. In this example, the image is identified based on the image having a position that is within such an area.

At block 16, the method 10 presents a representation of the image in a CGR environment based on the position of the image capture device at the time when the image was captured. The representation may be presented in the CGR environment based on three dimensional (3D) coordinates (e.g., latitude, longitude, elevation/height) corresponding to 3D coordinates of the image capture device at the time when the image was captured. The representation may represent the content of the image itself. For example, a representation (e.g., a small floating rectangle with the image of the Eiffel Tower from 10 years ago) may be added as a virtual object at the same 3D location as the image capture device that took that prior image, e.g., 5 feet from the curb, directly between the light posts, and 50 inches above the sidewalk.

The representation may have an orientation based on the orientation of the image capture device that took the prior image, e.g., normal to the image capture device camera direction. The representation may be oriented to have the same orientation of a display of the image capture device, e.g., the front face of a mobile phone where the back facing camera was used. The representation may thus in some implementations have a pose (e.g., position and orientation) in 3D space that is based on the pose of the camera when the image was captured.

The representation may be the image itself, an icon, text, the image plus additional content, etc. The representation may have characteristics based on the intrinsics, extrinsics, optics, semantic information, or context associated with the capturing of the image. Such characteristics may provide more information or an otherwise better experience to the user, for example, providing the user within information about which camera settings to use and which time of day to recreate a new version of a prior image.

In some implementations, the representation is based on characteristics of the image capture device. For example, the representation may be sized or shaped based on an amount of zoom, resolution, depth, scale, or focal characteristics of the image capture device at the time when the image was captured by the image capture device. In some implementations, larger size is used as an indication of greater zoom and smaller size is used as an indication of lesser zoom. In some implementations, a frustum-shaped representation is used to represent an amount of zoom - from a rectangle of the full zoomed out image area into a smaller rectangle representing the zoomed in area of an image. In some implementations, an image includes both the intended content of a zoomed in area and additional content that would have been included without the zooming. A representation such as a frustum-shaped representation may be used to represent both the total content and the zoomed content and the relationship between the two.

In some implementations, the size of the representation is determined based on a resolution of the image capture device that was used when the image was captured by the image capture device. In some implementations, larger size is used as an indication of greater resolution and smaller size is used as an indication of lesser resolution.

In some implementations, the representation is based on the context in which the image was captured by the image capture device. For example, the representation may include text or graphics that are indicative of the context. In some implementations, the representation displays text descriptive of semantics such as the date and time that the photo was taken or distance of the camera from a particular object when the prior photo was taken.

In some implementations, metadata that is stored with or about the image is used to configure the representation of the image. For example, the image may include metadata identifying the position of the image capture device at the time when the image was captured by the image capture device, a pose (position and orientation) of the image capture device at the time when the image was captured by the image capture device, intrinsics/extrinsics of the image capture device at the time when the image was captured by the image capture device, or tags or description of the context in which the image was captured by the image capture device.

In some implementations, the image is part of a video and the representation represents multiple frames of the video or the entire video content. For example, the representation may provide a time-rotating sequence of those frames. In another example, the image capture device was moved during capture of the video and the representation in the CGR environment moves in a similar way. For example, if the video was captured as the user walked down a hiking path, the representation may be a series of frames (potentially connected by lines or other graphics) that are positioned along the movement path of the image capture device. In some implementations, the representation translates and rotates based on translation and rotation of the image capture device while the video was captured by the image capture device. In some implementations, the representation rotates based on rotation of the image capture device while the video was captured by the image capture device but does not translate based on translation of the image capture device while the video was captured by the image capture device. In such implementations, rigid transformation may be disabled in the representation, e.g., disabling the translation so that, in the case of a long video with a lot of walking, the scene will be projected from the same point and only rotate according to the captured device's rotation. In other implementations, rotational movement is suppressed in one or more directions (e.g., suppressing up and down movement) to avoid a jittery or otherwise undesirable appearance.

In some implementations, a representation of a video sequence accounts for changes in zoom that may occur over the course of a video. The change in the amount of zoom, for example, may be represented by changing the size or shape of the representation. In some implementations, larger size is used as an indication of greater zoom and smaller size is used as an indication of lesser zoom. In some implementations, a frustum-shaped representation is used to represent an amount of zoom - from a rectangle of the full zoomed out image area into a smaller rectangle representing the zoomed in area of an image. In the case of changing zoom, the shape and size of such a frustum may change over time accordingly.

The representation of the existing image is presented in a CGR environment. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense or interact with a CGR object using any one of their senses, including sight, sound, touch, taste, and smell. For example, a person may sense or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense or interact with virtual objects in the VR environment through a simulation of the person's presence within the computer-generated environment, or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
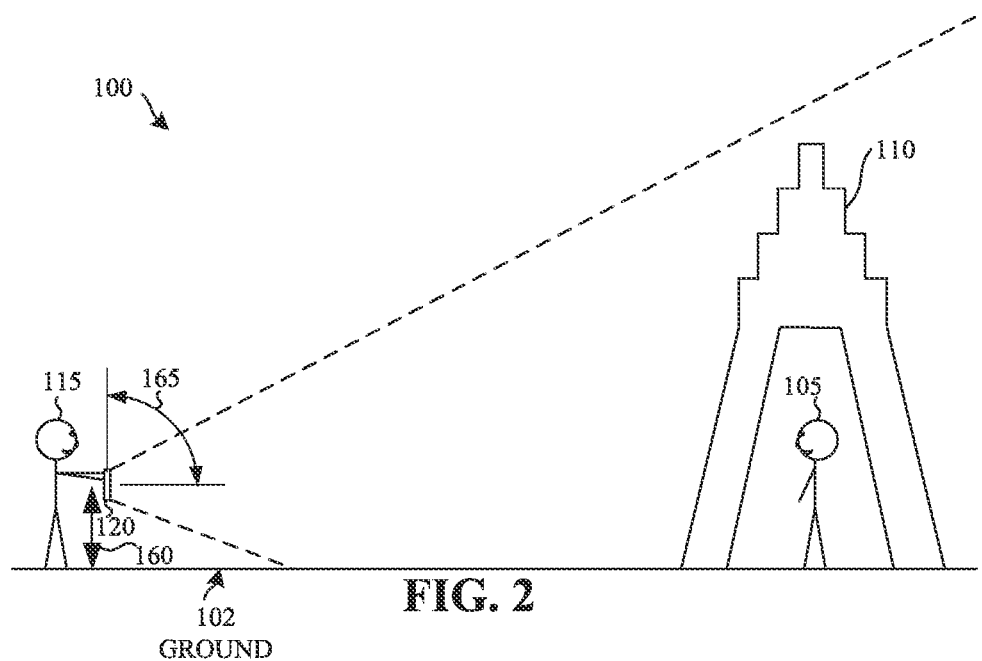
FIG. 2 is a block diagram illustrating a device capturing a first image of a physical environment.

FIGS. 2-5 illustrate a physical environment 100 in which a first image 300 is captured and then represented in a later provided computer generated reality (CGR) environment 510. FIG. 2 is a block diagram illustrating a device 120 capturing a first image 300 (FIG. 3) of the physical environment 100. The user 115 holds the image capture device 120 at a position and captures the first image 300. The image may be a single image, multiple images, or a video comprising a sequence of video frames.

The image capture device 120 has a location (e.g., x, y, z coordinates in the physical environment 100) that may be associated with the first image 300. For example, the image capture device 120 may use GPS data, sensor data, image content, or received information to determine location coordinates and the image 300 may include metadata that specifies those location coordinates. In some implementations, the location of the image capture device 120 includes an elevation. In some implementations, the location of the image capture device 120 includes a height, e.g., height 160, of the image capture device relative to a reference such as the ground 102. In some implementations, the location of the image capture device 120 does not include a height or elevation.

The image capture device 120 has an orientation (e.g., angle 165, an orientation specified using rotation with respect to one, two, or three rotational axes, an orientation associated with a particular facing direction such as 15 degrees north by northwest, etc.) that may be associated with the first image 300, e.g., as metadata. The orientation may be determined, for example, using GPS data, sensor data, image content, SLAM, or received information.

In some implementations, the image capture device 120 has a relative location or pose (e.g. translation and rotation) associated with the first image 300 with respect to the semantic segmentation of the image content. For example, the semantic information may be identified at the time the first image 300 is captured via sensors on the image capture device 120 or at the same or a later time via computer vision techniques using one or more images. The semantic information may identify the relative location or pose of image content, e.g., the camera is 150 meters from mountain, the mountain is in a particular angular direction from the camera, the camera is 10 meters left of the traffic lights, etc. This information may be stored as metadata or otherwise associated with the first image 300.

Figure 3:
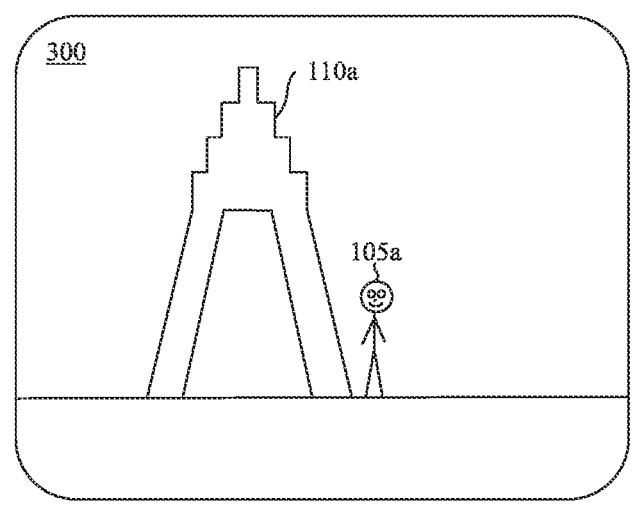
FIG. 3 is a block diagram illustrating content of the first image captured by the device of FIG. 2.

The physical setting includes a monument 110 and a person 105. In this example, the user 115 uses the image capture device 120 to capture the first image 300 of the monument and the person 105 at a first point in time. FIG. 3 is a block diagram illustrating the content of the first image 300 captured by the image capture device 120 at the first point in time. In this example, the first image 300 includes a depiction 110a of the monument 110 and a depiction 105a of the person 105.

Figure 4:
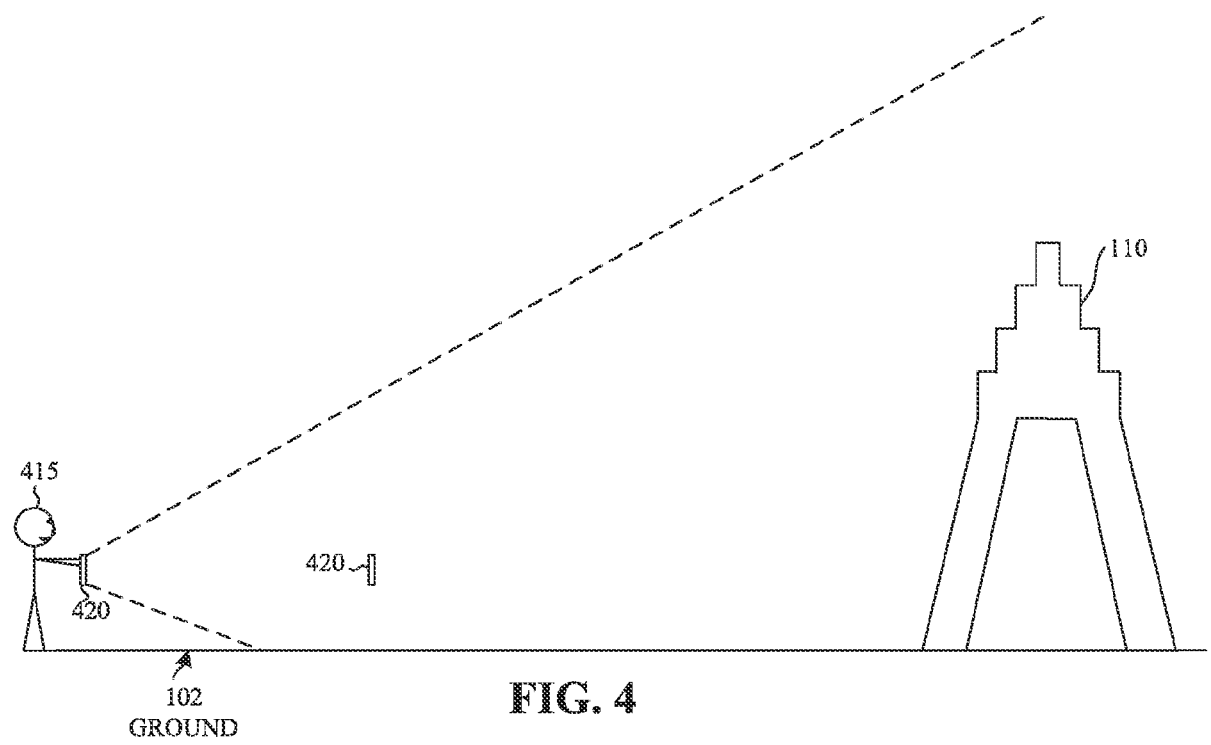
FIG. 4 is a block diagram illustrating a device capturing a second image of the physical environment of FIG. 2 for use in a CGR environment.
Figure 5:
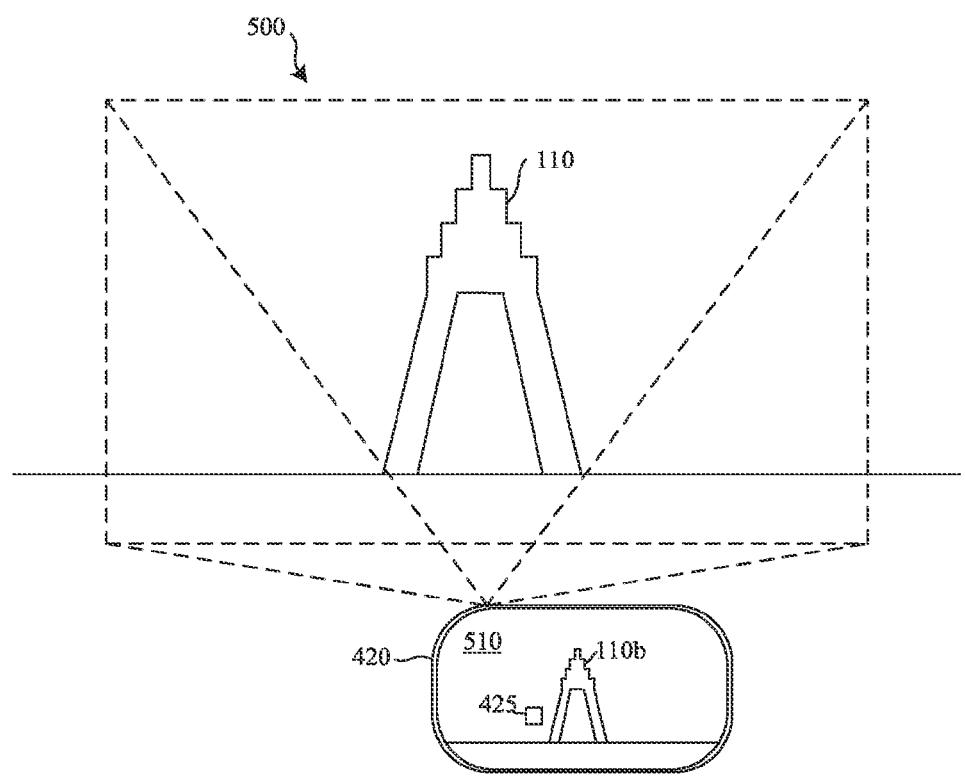
FIG. 5 is a block diagram illustrating the device of FIG. 4 capturing the second image and providing a CGR environment that includes content based on the second image and virtual content based on the first image.

FIGS. 4 and 5 are block diagrams illustrating a device 420 capturing a second image 500 of the physical environment 100 at a second point in time for use in a CGR environment 510. In this example, the physical environment 100 includes the ground 102 and monument 110, but user 105 is no longer present. The user 415 uses the image capture device 420 to experience a CGR environment (510 of FIG. 5). During the presentation of the CGR environment 510, the image capture device 420 captures one or more images of the physical environment 100 for use in providing the CGR environment 510. For example, some or all of the image content may be included in the CGR environment 510. In this example, the second image 500 of the physical environment 100 at the second point in time is captured and used to provide a part of (but not all of) the CGR environment 510. The CGR environment 510 includes content based on the second image 500, including a depiction 110b of the monument 110.

The CGR environment also include a representation 425 of the first image 300 based on the location that the first image 300 was captured at the first point in time. As shown in FIG. 4, the first image 300 was captured from location 400 in the physical setting 100. During the CGR environment, the device 420 determines its location and identifies the first image 300 based on its similar location, e.g., within its field of view, within a threshold distance, etc. Moreover, the device 420 determines the orientation of the image capture device 120 at the first instant in time when the first image 300 was captured. For illustrative purposes, the location 420 is depicted in FIG. 4 - the image capture device 120 is not actually present in the physical environment 100 at the second point in time.

The device 120 may additionally determine the orientation of the image capture device 120 at the first point in time, zoom, focus, other attributes of the image capture device at the first point in time, or other information about the physical setting or capturing of the first image 300 at the first point in time. The additional information may be used to configure the representation 425 of the first image 300 that is included in the CGR environment. For example, the orientation, size, text, or other characteristics of the representation may be based on or depict this information.

Figure 6:
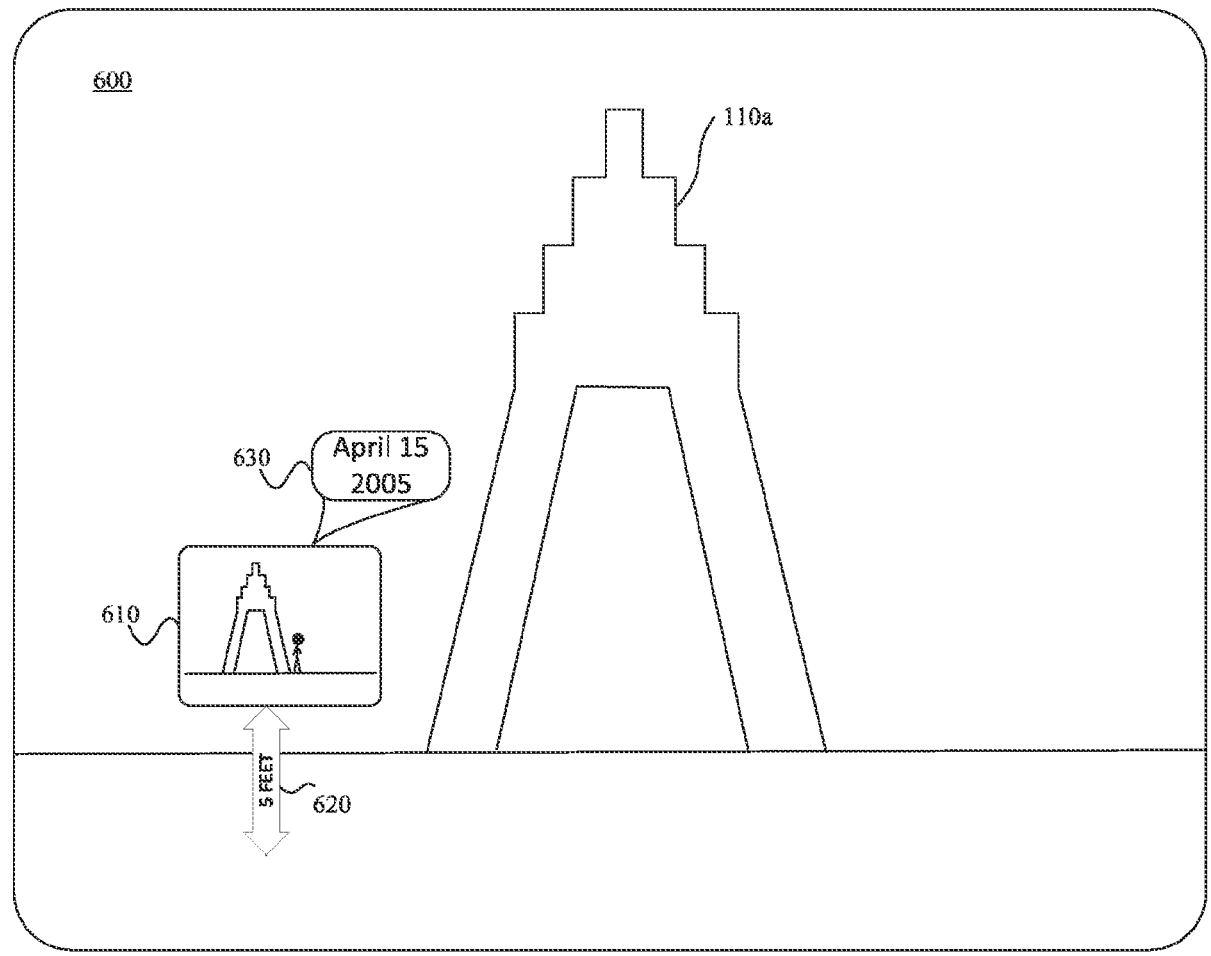
FIG. 6 is a block diagram illustrating another example of CGR environment that includes content based on the second image and virtual content based on the first image.

FIG. 6 is a block diagram illustrating another example of CGR environment 600 that includes content based on the second image 500 and virtual content based on the first image 300. The CGR environment 510 includes content based on the second image 500, including a depiction 110b of the monument 110. In this example, the CGR environment 600 also includes representations 610, 620, 630 of the first image 300 based on the position that the first image 300 was captured at the first point in time. The first representation 610 is the actual content of the first image 300 (e.g., the depiction 110a of the monument 110 and the depiction 105a of the person 105). The second representation 620 is a virtual arrow with text indicating that the first image 300 was captured 5 feet above the ground. The third representation 630 is a text bubble with text indicating that the first image 300 was captured on a particular date (e.g., Apr. 15, 2005).

The illustrative representations 610, 620, 630 illustrate a few of numerous ways that attributes of an existing image may be depicted within a CGR environment. Representations may be configured in any of un-numerable ways to represent the content of an existing image, its relationship to the user's current situation, information about the capturing of the existing image, and any other relevant information. Moreover, the type of information and the form of the representation may be configured by or customized by the user. For example, a sophisticated camera enthusiast may prefer to see representations that provide more information about the camera intrinsics at the time the existing image was captured while another user may prefer to see labels identifying the people or objects depicted in the existing image.

Figure 7:
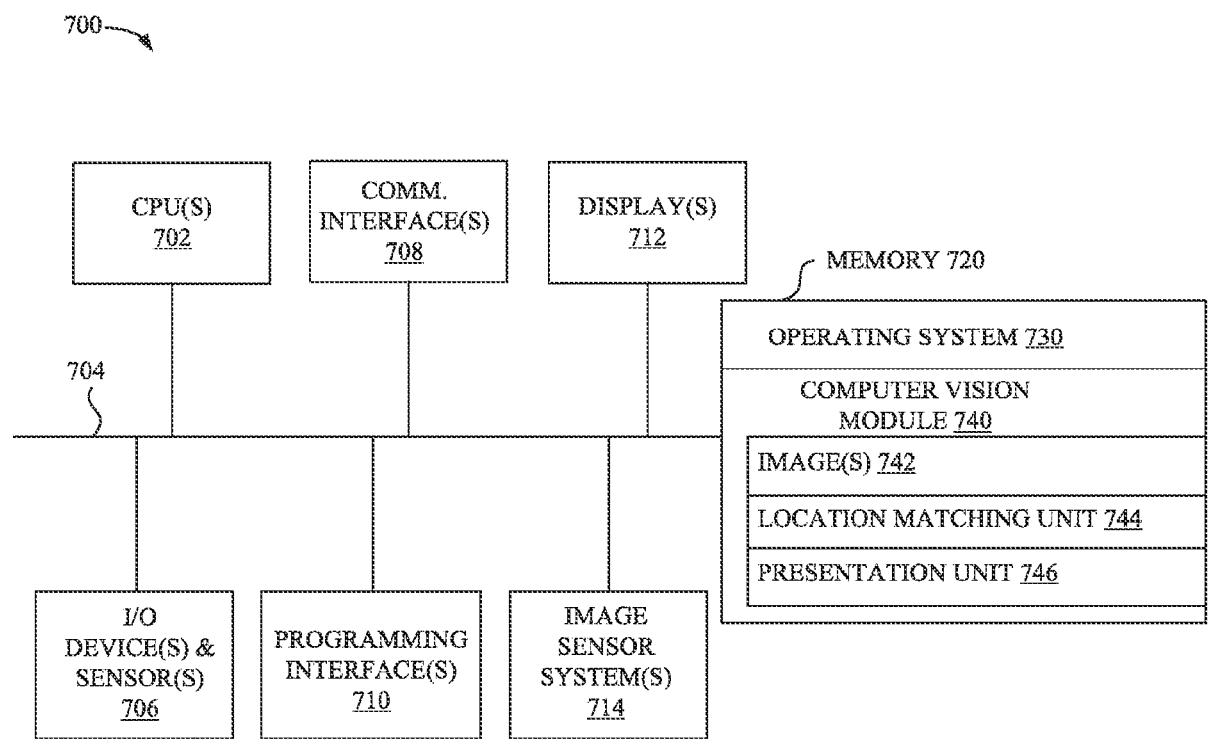
FIG. 7 is a block diagram of an example system architecture of an exemplary device in accordance with some implementations.

FIG. 7 is a block diagram of an example system architecture of an exemplary device configured to facilitate computer vision tasks in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 710, one or more displays 712, one or more interior or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 712 are configured to present images from the image sensor system(s) 714. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 712 correspond to diffractive, reflective, polarized, holographic, etc. waveguide displays. For example, the device 700 includes a single display. In another example, the device 700 is a head-mounted device that includes a display for each eye of the user.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730, images 742, a location matching unit 744, and a presentation unit 746.

The operating system 730 includes procedures for handling various basic system services and for performing hardware dependent tasks. In some implementations, the location matching unit 744 identifies a location of a computing device providing a CGR environment and identifies one or more images associated with matching positions (e.g., within predetermined distances, within the field of view etc.). The presentation unit 746 provides the CGR environment, for example, by providing virtual reality content or mixed reality content based on images captured by the image sensor system(s) 714. Although these modules and units are shown as residing on a single device (e.g., the device 700), it should be understood that in other implementations, any combination of the these modules and units may be located in separate computing devices.

Moreover, FIG. 7 is intended more as a functional description of the various features which are present in a particular implementation as opposed to a structural schematic of the implementations described herein. As recognized by those of ordinary skill in the art, items shown separately could be combined and some items could be separated. For example, some functional modules and units shown separately in FIG. 7 could be implemented in a single module or unit and the various functions of single functional blocks could be implemented by one or more functional blocks in various implementations. The actual number of modules and units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise.

It will also be understood that the terms "or" and "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modifications may be implemented by those skilled in the art without departing from the scope and spirit of the invention.

What is claimed is:

1. A method comprising:
   on a computing device having a processor:
   identifying a location of the computing device in a physical environment at a first time;
   identifying an image based on the location of the computing device in the physical environment at the first time and a position of an image capture device at a second time when the image was captured by the image capture device, wherein the second time is prior to the first time; and
   presenting a representation of the image in a computer generated reality (CGR) environment based on the position of the image capture device at the second time when the image was captured.

2. The method of claim 1, wherein the representation is presented in the CGR environment based on three dimensional (3D) coordinates corresponding to 3D coordinates of the image capture device at the time when the image was captured.

3. The method of claim 1, wherein the representation is presented in an orientation corresponding to an orientation of the image capture device at the time when the image was captured.

4. The method of claim 1, wherein the representation comprises the image, an icon depicting content of the image, or text describing content of the image.

5. The method of claim 1, wherein the representation is based on characteristics of the image capture device.

6. The method of claim 5, wherein the representation is based on an amount of zoom or focal characteristics of the image capture device at the time when the image was captured by the image capture device.

7. The method of claim 5, wherein a size of the representation is determined based on a resolution of the image capture device used when the image was captured by the image capture device.

8. The method of claim 1, wherein the representation is based on the context in which the image was captured by the image capture device.

9. The method of claim 1, wherein the image comprises metadata identifying:
   the position of the image capture device at the time when the image was captured by the image capture device;
   an orientation of the image capture device at the time when the image was captured by the image capture device;
   intrinsics of the image capture device at the time when the image was captured by the image capture device; or
   a context in which the image was captured by the image capture device.

10. The method of claim 1, wherein the image is a frame of a video, wherein the representation depicts multiple frames of the video.

11. The method of claim 10, wherein the representation translates or rotates based on translation or rotation of the image capture device while the video was captured by the image capture device.

12. The method of claim 10, wherein the representation:
    rotates based on rotation of the image capture device while the video was captured by the image capture device; and
    does not translate based on translation of the image capture device while the video was captured by the image capture device.

13. The method of claim 10, wherein the representation depicts a changing attribute (e.g., zoom) of a video.

14. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
    identifying a location of the computing device in a physical environment at a first time;
    identifying an image based on the location of the computing device in the physical environment at the first time and a position of an image capture device at a second time when the image was captured by the image capture device, wherein the second time is prior to the first time; and
    presenting a representation of the image in a computer generated reality (CGR) environment based on the position of the image capture device at the second time when the image was captured.

15. The system of claim 14, wherein the representation is presented in the CGR environment based on three dimensional (3D) coordinates corresponding to 3D coordinates of the image capture device at the time when the image was captured.

16. The system of claim 14, wherein the representation is presented in an orientation corresponding to an orientation of the image capture device at the time when the image was captured.

17. The system of claim 14, wherein the representation comprises the image, an icon depicting content of the image, or text describing content of the image.

18. The system of claim 14, wherein the representation is based on characteristics of the image capture device.

19. A non-transitory computer-readable storage medium, storing program instructions computer-executable on a computer to perform operations comprising:
- identifying a location of the computing device in a physical environment at a first time;
- identifying an image based on the location of the computing device in the physical environment at the first time and a position of an image capture device at a second time when the image was captured by the image capture device, wherein the second time is prior to the first time; and
- presenting a representation of the image in a computer generated reality (CGR) environment based on the position of the image capture device at the second time when the image was captured.

20. The non-transitory computer-readable storage medium of claim 19, wherein the representation is presented in the CGR environment based on three dimensional (3D) coordinates corresponding to 3D coordinates of the image capture device at the time when the image was captured.

21. The non-transitory computer-readable storage medium of claim 20, wherein the representation is presented in an orientation corresponding to an orientation of the image capture device at the time when the image was captured.

* * * * *